United States Patent
Jiang et al.

(10) Patent No.: US 7,429,493 B2
(45) Date of Patent: Sep. 30, 2008

(54) METHOD FOR FABRICATING A MAGNETIC HEAD FOR PERPENDICULAR RECORDING USING A CMP LIFT-OFF AND RESISTANT LAYER

(75) Inventors: Ming Jiang, San Jose, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 255 days.

(21) Appl. No.: 11/184,364

(22) Filed: Jul. 18, 2005

(65) Prior Publication Data

US 2007/0026537 A1   Feb. 1, 2007

(51) Int. Cl.
*H01L 21/00* (2006.01)

(52) U.S. Cl. .............................. 438/3; 438/738; 360/122

(58) Field of Classification Search .............. 29/603.01, 29/603.13; 216/22; 360/118, 122; 257/422; 438/3, 738
See application file for complete search history.

(56) References Cited

U.S. PATENT DOCUMENTS

| | | | |
|---|---|---|---|
| 4,943,882 A | 7/1990 | Wada et al. | |
| 5,349,745 A | 9/1994 | Kawabe et al. | |
| 5,875,542 A | 3/1999 | Tran et al. | |
| 6,694,604 B2 | 2/2004 | Santini | |
| 6,728,064 B2 | 4/2004 | Sato et al. | |
| 6,738,222 B2 | 5/2004 | Sato et al. | |
| 6,775,099 B2 | 8/2004 | Kuroda et al. | |
| 6,785,953 B2 | 9/2004 | Santini | |
| 2002/0012195 A1 | 1/2002 | Lahiri et al. | |
| 2002/0084243 A1 | 7/2002 | Hsiao et al. | |
| 2005/0066517 A1* | 3/2005 | Bedell et al. ............. | 29/603.13 |
| 2005/0241140 A1* | 11/2005 | Baer et al. ............... | 29/603.01 |
| 2006/0000795 A1* | 1/2006 | Chen et al. .................... | 216/22 |
| 2006/0044682 A1* | 3/2006 | Le et al. ..................... | 360/126 |
| 2006/0278604 A1* | 12/2006 | Yoshida et al. ................ | 216/22 |

FOREIGN PATENT DOCUMENTS

| | | |
|---|---|---|
| JP | 62204420 | 9/1987 |
| JP | 8102014 | 4/1996 |
| JP | 2004095006 | 3/2004 |

* cited by examiner

*Primary Examiner*—Brook Kebede
*Assistant Examiner*—Phillip Green
(74) *Attorney, Agent, or Firm*—G. Marlin Knight

(57) ABSTRACT

A method using a CMP resistant hardmask in a process of fabricating a pole piece for a magnetic head is described. A set of layers used as the mask for milling the pole piece preferably includes a CMP resistant hardmask of silicon dioxide, a resist hardmask, an upper hardmask and a photoresist mask respectively. A multi-step reactive-ion etching (RIE) process is preferably used to sequentially remove the excess materials in the layer stack to ultimately define the multilayer mask for the pole piece. The excess pole piece material is then milled away. The wafer is then refilled with a nonmagnetic material such as alumina. A CMP liftoff is used to remove the resist hardmask. The material for the CMP resistant hardmask is selected to have a high resistance to the CMP liftoff process in comparison to the refill material. The CMP resistant hardmask is preferably then removed by a RIE process.

20 Claims, 3 Drawing Sheets

METHOD FOR FABRICATING A MAGNETIC HEAD FOR PERPENDICULAR RECORDING USING A CMP LIFT-OFF AND RESISTANT LAYER

FIELD OF THE INVENTION

The invention relates to the field of thin film device fabrication and more particularly to methods, materials and structures used to fabricate a magnetic head used in data storage devices; and even more particularly, the invention relates to methods, materials and structures used in combination with CMP lift-off processes during the fabrication of magnetic heads for perpendicular recording.

BACKGROUND OF THE INVENTION

The read and write head portions of the slider for use in a typical prior art magnetic disk recording system are built-up in layers using thin film processing techniques. Typically the read head is formed first, but the write head can also be fabricated first. The conventional write head is inductive and the read sensor is magnetoresistive. In the typical process of fabricating thin film magnetic transducers, a large number of transducers are formed simultaneously on a wafer. After the basic structures are formed the wafer is cut into rows or individual sliders. In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head.

The shape of main pole piece at the ABS is critical for the performance of the write head. One approach of defining the main pole piece in a perpendicular head is to ion mill a laminated magnetic film using a hard mask, which is usually formed by milling through a layer of organic resist material such as Duramide using a photoresist mask. Due to the nature of ion milling, fencing is formed on the sidewall of remaining hard mask. Conventional stripping processes like wet strip or snow cleaning all have their disadvantages in removing the remaining hard mask. Wet stripping may not completely remove hard mask due to the fencing. This will make subsequent trailing shield fabrication process impossible due to plating etch problems from incomplete seed deposition over the fencing. On the other hand, snow cleaning could easily bow the critical pole piece shape. A CMP assisted lift-off process used in the prior art can effectively remove fencing but it can also lift off the hard mask. Therefore, an alumina refilling step is used after ion milling has been completed and before the CMP liftoff. CMP will polish off the higher topography areas, which usually is the stack of resist with refill material on top. However, very commonly, after the higher topography is removed, the pole underneath the hard mask, is damaged or rounded since nearby alumina is removed by CMP slurry.

What is needed is an improved method of fabricating the main pole piece structure for the write head.

SUMMARY OF THE INVENTION

An embodiment of a method according to the invention uses a CMP resistant hardmask as a part of the process of fabricating a pole piece for a magnetic head. After the magnetic film or films for the main pole piece have been deposited over the entire wafer a set of mask layers are deposited and patterned over the selected pole piece area. The set of layers preferably includes a CMP resistant hardmask, a resist hardmask, an upper hardmask and a photoresist mask respectively. The photoresist mask on top of the stack is patterned to define the desired shape of the pole piece. A multi-step reactive-ion etching (RIE) process is preferably used to sequentially remove the excess materials in the layer stack around the photoresist pad to ultimately define the multilayer mask structure for the pole piece. Once the surface of the pole piece material has been exposed around the multilayered mask pad, the excess pole piece material is milled away to define the pole piece. The wafer is then refilled with a nonmagnetic material such as alumina. A CMP liftoff is used to remove the resist hardmask. The material for the CMP resistant hardmask is selected to have a high resistance to the CMP liftoff process in comparison to the refill material. The fact that the preferred material (silicon dioxide) for the hardmask has a high selectivity of over the alumina refill in known CMP processes ensures that the CMP resistant hardmask will survive the CMP and protect the underlying pole piece. The CMP resistant hardmask is preferably then removed by a RIE process. An alternative embodiment uses an additional first layer in the stack which can be a layer of alumina which serves to provide additional resistance when the pole piece material is removed by a milling process such as argon milling.

DETAILED DESCRIPTION OF THE INVENTION AND THE PREFERRED EMBODIMENTS

Figure 1:
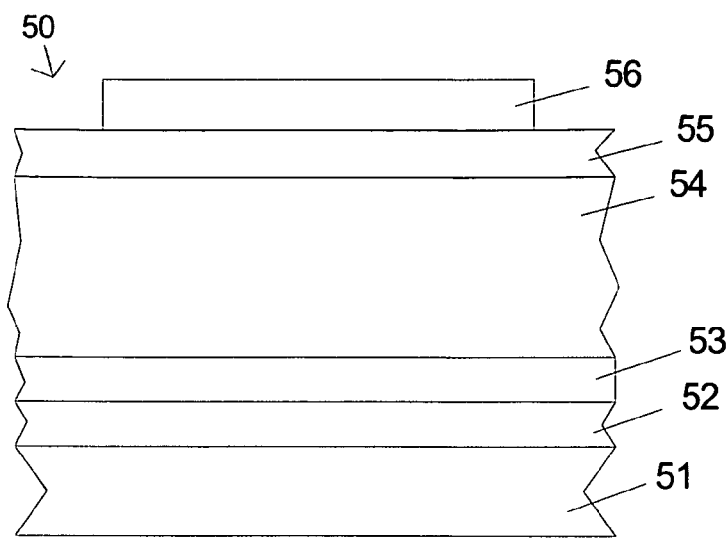
FIG. 1 illustrates an initial point in a process of fabricating a head according to the invention.

FIG. 1 is an illustration of a section of a wafer 50 on which thin film magnetic heads are being fabricated according to the invention. The section is taken perpendicular to the surface of the wafer and the plane of the thin films. Typically a large number of heads or other devices are fabricated simultaneously on a wafer. The discussion below illustrates the method of the invention for a single head, but any number of heads can be fabricated simultaneously with the invention. The relative dimensions of the films and structures of the magnetic head are according to the prior art except where noted. At the stage of the process shown in FIG. 1, the magnetic film or films 51 for the main pole piece have been deposited over the entire wafer. The layers are shown with optional first hardmask 52. The hardmask 52 is preferably alumina which will provide additional resistance during the subsequent argon milling phase used to remove excess magnetic material. The CMP resistant hardmask 53 according to the invention is preferably made of silicon dioxide ($SiO_2$) and is deposited over the entire wafer. The selection of silicon dioxide for this layer allows high selectivity over alumina refill material during the subsequent CMP liftoff step. The resist hardmask 54 is also full film at this stage of the process. A thin upper hardmask layer 55, preferably silicon dioxide, is deposited on top of the resist hardmask. The photoresist mask or pad 56 has been patterned over the layer stack to define the desired shape of the pole piece.

Figure 2:
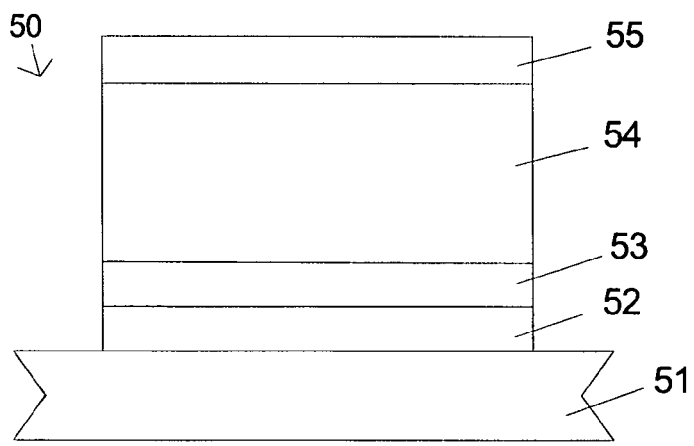
FIG. 2 illustrates a second point in a process of fabricating a head according to the invention after reactive-ion milling has been used to define the mask structure for the pole piece.

FIG. 2 illustrates a second point in a process of fabricating a head according to the invention after a multi-step reactive-ion etching (RIE) process has been used to define the mask structure for the pole piece. The mask structure as shown includes the first hardmask 52, the CMP resistant hardmask 53, the resist hardmask 54 and the upper hard mask 55. Because the mask structure includes diverse materials, multiple RIE steps are needed as is known in the prior art. The initial RIE step removes the exposed upper hardmask, which is preferably silicon dioxide around the photoresist pad. A fluorine-based RIE is typically used for removing silicon dioxide. The resist hardmask 54, which is typically an organic material, is then removed preferably using an oxygen plasma RIE. The layer under the resist hardmask 54 is the CMP resistant hardmask 53. If silicon dioxide ($SiO_2$) is used then a fluorine-based RIE is again preferred to remove this layer. The remaining exposed mask layer is the optional hardmask 52, which is preferably alumina, which can be removed using a chlorine-based RIE. None of these RIE steps will affect the metallic material, typically NiFe, used for the magnetic film 51 which will be intact at this point in the process.

Figure 3:
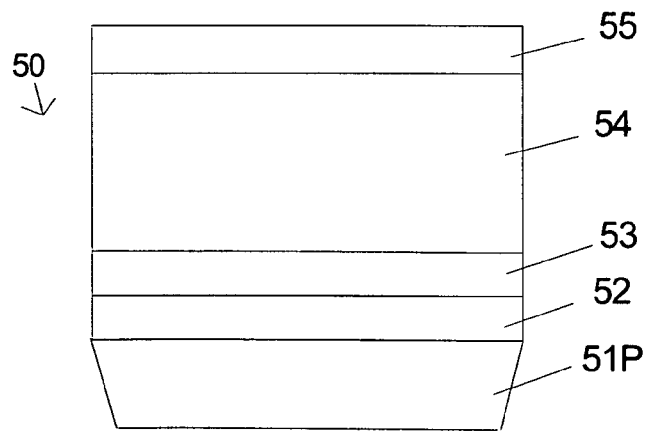
FIG. 3 illustrates a third point in a process of fabricating a head according to the invention after argon milling has been used to remove the unmasked metal to form the pole piece.
Figure 4:
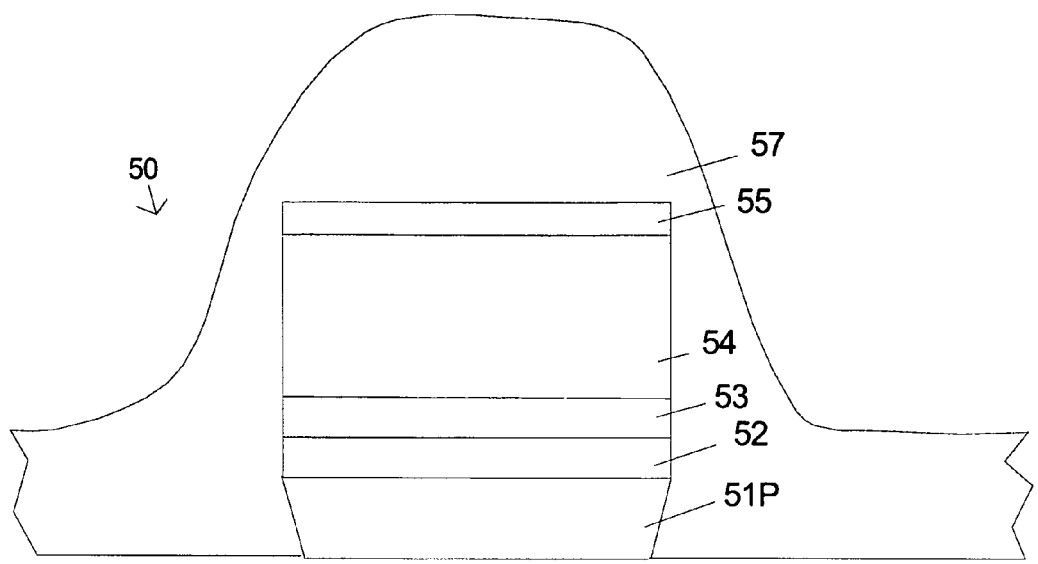
FIG. 4 illustrates a fourth point in a process of fabricating a head according to the invention after refilling the wafer.

FIG. 3 illustrates a third point in a process of fabricating a head according to the invention after argon milling has been used to remove the unmasked metal in film 51 to form the pole piece 51P. The wafer is refilled at this point preferably with alumina as illustrated in FIG. 4. The refill depth is preferably selected to bring the level of the refill material above the top of the pole piece 51P to prepare for a CMP liftoff. A reasonable value for the depth of the refill is about 0.5 microns.

Figure 5:
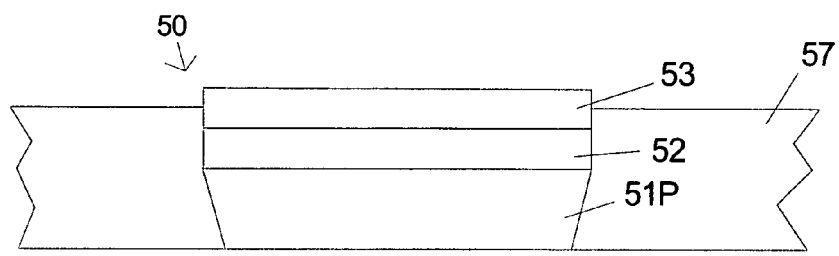
FIG. 5 illustrates a fifth point in a process of fabricating a head according to the invention after CMP liftoff.

FIG. 5 illustrates a fifth point in a process of fabricating a head according to the invention after CMP liftoff. The CMP removes the resist hardmask above the CMP resistant hardmask 53. The fact that the preferred silicon dioxide hardmask has a selectivity of approximately 100:1 over alumina in prior art CMP processes ensures that the CMP resistant hardmask 53 will survive the CMP and protect the underlying pole piece 51P. After the CMP liftoff the remaining alumina refill will preferably be slightly above the plane of the top surface of the pole piece.

Figure 6:
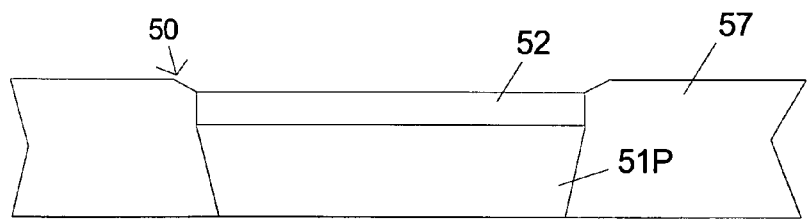
FIG. 6 illustrates a sixth point in a process of fabricating a head according to the invention after RIE has removed the remaining mask material.

FIG. 6 illustrates a sixth point in a process of fabricating a head according to the invention after RIE has removed the remaining CMP resistant mask material leaving the first hardmask 52 over the surface of the pole piece 51P. The surface of the first hardmask 52 is preferably slightly below the plane of the surrounding alumina refill 57 as shown. If the first hardmask is made of alumina it can be left in place in the final head. If silicon dioxide is used for the CMP resistant mask material, it should not be left in place since it is an incompatible material for depositing the subsequent layers of the head.

Figure 7:
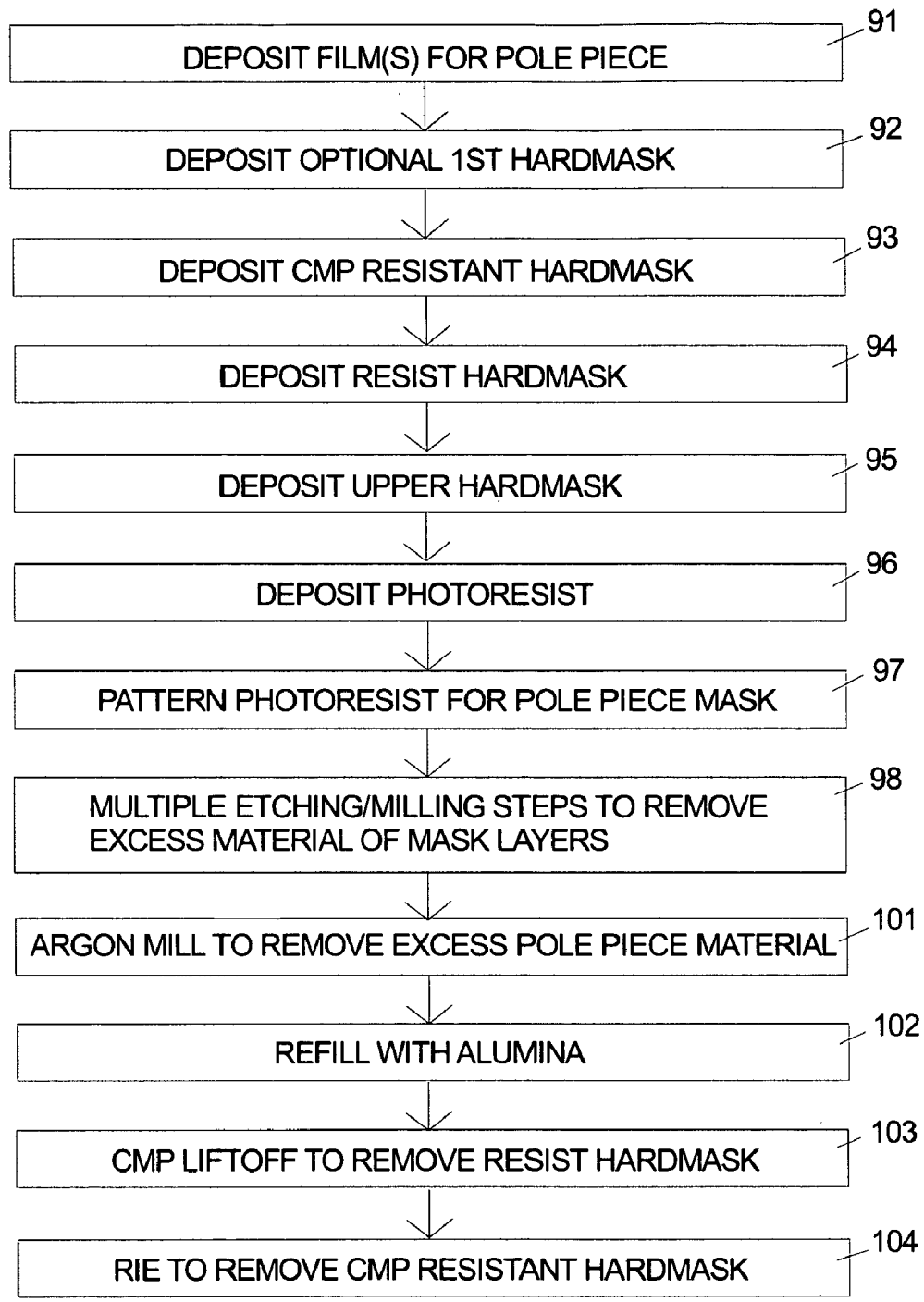
FIG. 7 is a flowchart of a method according to the invention.

FIG. 7 is a flowchart of a method according to the invention. The magnetic film or films for the main pole piece are been deposited over the entire wafer 91. The optional first hardmask layer, which is preferably alumina, is deposited 92. The CMP resistant hardmask layer, which is preferably silicon dioxide, is then deposited 93. The resist hardmask layer is then deposited 94. The upper hardmask layer is then deposited 95. The photoresist mask is then deposited 96. The photoresist mask on top of the stack is patterned into a pad to define the desired shape of the pole piece 97. The multi-step reactive-ion etching (RIE) process is preferably used to sequentially remove the excess materials around the photoresist pad on top of the layer stack to ultimately define the multilayer mask structure for the pole piece 98. The excess pole piece material is then milled away 101 using a process such as argon milling. The wafer is then refilled with a nonmagnetic material such as alumina 102. A CMP liftoff is performed to remove everything above the CMP resistant hardmask including the resist hardmask 103. The CMP resistant hardmask is preferably then removed by a RIE process 104. If the first hardmask is alumina it can be left in place over the pole piece. The prior art process of fabricating a magnetic head is resumed at this point. If the head includes a trailing shield, it would be fabricated at this stage.

Although the embodiments of the invention have been described in particular embodiments those skilled in the art will recognize that the invention may be used in other embodiments where similar conditions exist.

The invention claimed is:

1. A method of fabricating thin film magnetic heads on a wafer comprising the steps of:
   depositing a layer of magnetic material for a pole piece on a wafer;
   depositing a layer of a first selected material for a CMP resistant hardmask on the layer of magnetic material for the pole piece;
   depositing a layer of a second selected material for a resist hardmask above the CMP resistant hardmask;
   depositing a layer of a third selected material for an upper hardmask above the resist hardmask;
   depositing a photoresist material;
   forming a photoresist pad by patterning the photoresist material to define a shape of the pole piece;
   removing excess material in the upper hardmask resist hardmask and CMP resistant hardmask around the photoresist pad to expose excess material in the layer of magnetic material for the pole piece;
   removing excess material in the layer of magnetic material for the pole piece;
   refilling the wafer with nonmagnetic refill material;
   removing the resist hardmask from above the CMP resistant hardmask using a CMP liftoff process which removes the refill material at a faster rate than the CMP resistant hardmask reducing a surface of the refill material adjacent to the CMP resistant hardmask to below a surface of the CMP resistant hardmask; and
   removing the CMP resistant hardmask forming a recessed surface.

2. The method of claim 1 wherein the first selected material for the CMP resistant hardmask is silicon dioxide and the nonmagnetic refill material is alumina.

3. The method of claim 1 further comprising the step of depositing the first hardmask material after depositing the layer of magnetic material and before depositing the layer of the first selected material for the CMP resistant hardmask.

4. The method of claim 3 wherein the first hardmask material is alumina.

5. The method of claim 3 wherein the first hardmask material forms a pad over the pole piece which is never removed.

6. The method of claim of 1 wherein the step of removing the CMP resistant hardmask further comprises using a RIE process to remove the CMP resistant hardmask.

7. The method of claim 1 wherein the step of refilling the wafer with a nonmagnetic refill material further comprises depositing the refill so that a top surface of the refill material is above a top surface of the pole piece.

8. The method of claim 1 wherein the step of removing excess material in the upper hardmask, resist hardmask and CMP resistant hardmask further comprises performing a sequence of reactive ion processes.

9. A method of fabricating thin film magnetic heads on a wafer comprising the steps of:
   depositing a layer of magnectic material for a pole piece on a wafer;
   depositing a first hardmask material on the layer of magnectic material;
   depositing a layer of a first selected material for a CMP resistant hardmask layer on the first hardmask material;
   depositing a layer of a second selected material for a resist hardmask on the CMP resistant hardmask layer;
   depositing a layer of a third selected material for an upper hardmask layer on the resist hardmask;
   depositing a photoresist material over the upper hardmask layer;
   forming a photoresist pad by patterning the photoresist material to define a shape of the pole piece;
   removing excess material in the upper hardmask, resist hardmask, CMP resistant hardmask and first hardmask material around the photoresist pad to expose excess material in the layer of a magnetic material for the pole piece;
   removing excess material in the layer of a magnetic material for the pole piece to form the pole piece;
   refilling the wafer with a nonmagnetic refill material;
   exposing the CMP resistant hardmask by removing the resist hardmask using a CMP liftoff process which removes the refill material at a faster rate than the CMP resistant hardmask resulting in the CMP resistant hardmask protruding above adjacent refill material; and
   removing the CMP resistant hardmask forming a recessed surface.

10. The method of claim 9 wherein the first selected material for the CMP resistant hardmask is silicon dioxide.

11. The method of claim 10 wherein the nonmagnetic refill material is alumina.

12. The method of claim 9 wherein the first hardmask material is alumina.

13. The method of claim 9 wherein the first hardmask material forms a pad over the pole piece which is never removed.

14. The method of claim of 9 wherein the step of removing the CMP resistant hardmask further comprises using a RIE process to remove the CMP resistant hardmask.

15. The method of claim 9 wherein the step of refilling the wafer with a nonmagnetic refill material further comprises depositing the refill so that a top surface of the refill material is above a top surface of the pole piece.

16. The method of claim 9 wherein the step of removing excess material in the upper hardmask, resist hardmask, CMP resistant hardmask and first hardmask material further comprises a performing a sequence of reactive ion processes.

17. A method of fabricating thin film magnetic heads on a wafer comprising the steps of:
   depositing a layer of magnectic material for a pole piece on a wafer;
   depositing a layer of silicon dioxide for a CMP resistant hardmask above the magnetic material;
   depositing a layer of a second selected material for a resist hardmask above the CMP resistant hardmask;
   depositing a layer of a third selected material for an upper hardmask above the resist hardmask;
   depositing a photoresist material;
   forming a photoresist pad by patterning the photoresist material to define a shape of the pole piece;
   removing excess material in the upper hardmask, resist hardmask and CMP resistant hardmask around the photoresist pad to expose excess material in the layer of a magnetic material for the pole piece;
   removing excess material in the layer of a magnetic material for the pole piece;
   refilling the wafer with alumina;
   exposing the CMP resistant hardmask by removing the resist hardmask using a CMP liftoff process which removes the alumina refill material at a faster rate than silicon dioxide in the CMP resistant hardmask resulting in the CMP resistant hardmask protruding above adjacent refill material; and
   removing the CMP resistant hardmask forming a recessed surface.

18. The method of claim 17 further comprising the step of depositing a layer of alumina for a first hardmask layer after depositing the layer of magnetic material and before depositing the layer of silicon dioxide for the CMP resistant hardmask.

19. The method of claim 18 wherein the alumina in the first hardmask layer forms a pad over the pole piece which is never removed.

20. The method of claim 17 wherein the step of refilling the wafer with alumina further comprises depositing the alumina so that a top surface of the alumina is above a top surface of the pole piece.

* * * * *